US005994650A

United States Patent [19]

Eriksson et al.

[11] Patent Number: 5,994,650

[45] **Date of Patent: *Nov. 30, 1999**

[54] SAFETY SYSTEM FOR LIFT TRUCKS

[75] Inventors: Lars Eriksson, Mantorp; Kurt-Ove Stenberg, Mjölby, both of Sweden

[73] Assignee: BT Industries AB, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,357

[22] Filed: Mar. 28, 1997

[30] Foreign Application Priority Data

| | | | |
|---|---|---|---|
| Mar. 28, 1996 | [SE] | Sweden | 9601184 |
| Mar. 28, 1996 | [SE] | Sweden | 9601185 |

[51] Int. Cl.[6] .......................... G01G 23/18; G01G 19/10; G01G 3/14

[52] U.S. Cl. ........................ 177/45; 177/141; 177/210 R; 361/87; 414/21; 701/50; 702/64; 702/174; 702/175

[58] Field of Search ............................... 177/45, 46, 141, 177/210 R, 47, 48, 49; 361/31, 87; 702/33, 41, 42, 43, 44, 64, 138, 173, 174, 175; 701/50; 414/21

[56] References Cited

U.S. PATENT DOCUMENTS

| | | | |
|---|---|---|---|
| 3,722,660 | 3/1973 | Snead | 177/16 |
| 4,068,773 | 1/1978 | Downing et al. | 177/45 |
| 4,560,110 | 12/1985 | Burda | 241/36 |
| 4,771,837 | 9/1988 | Appleton et al. | 177/141 |
| 4,792,004 | 12/1988 | Sheffield | 177/141 |
| 4,942,529 | 7/1990 | Avitan et al. | 701/50 |
| 5,167,287 | 12/1992 | Pomies | 177/141 |
| 5,238,086 | 8/1993 | Aoki et al. | 187/9 R |
| 5,393,939 | 2/1995 | Nasuta, Jr. et al. | 177/145 |
| 5,597,282 | 1/1997 | Hoffman et al. | 414/545 |
| 5,648,887 | 7/1997 | Herndon et al. | 361/31 |
| 5,666,295 | 9/1997 | Bruns | 177/141 |
| 5,698,957 | 12/1997 | Sowada | 361/31 |

FOREIGN PATENT DOCUMENTS

| | | | |
|---|---|---|---|
| WO 8702128 | 4/1987 | WIPO | 177/136 |

OTHER PUBLICATIONS

Gene Franklin, et al., *Feedback Control of Dynamic Systems*, Addison–Wesley Publishing Co., Reading, Mass., pp. 31–38, May 1987.

*Primary Examiner*—Randy W. Gibson
*Attorney, Agent, or Firm*—Hayes Soloway Hennessey Grossman & Hage PC

[57] ABSTRACT

In order to increase safety of lift trucks, a weight indication for the driver is provided so that the driver may know how heavy a load he is handling,. This weight indication is obtained by measuring the current to the motor of the hydraulic pump. In order to eliminate the risk that monetary variations may result in faulty measurements preferably a mean value of current is taken for a certain time or the value of the measured current is added during a fixed time interval. Obtained values are then multiplied by a conversion factor so that the weight in, for instance, kilograms is obtained and delivered to a suitable display device. Obtained values also may be used to provide a warning by sound or light should the load exceed the maximum allowed.

13 Claims, 1 Drawing Sheet

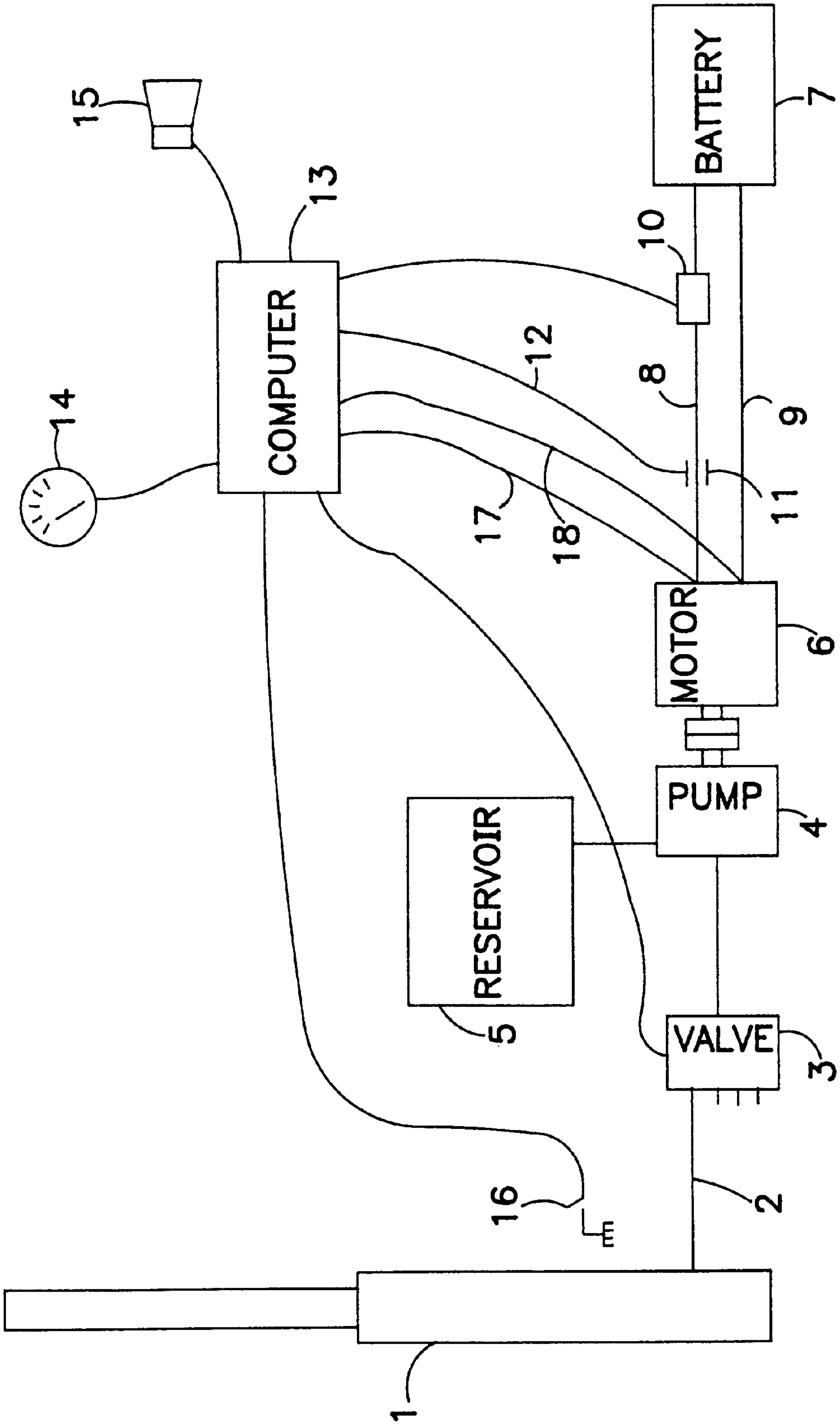
BATTERY
7
10
COMPUTER
13
15
14
12
8
9
11
17
18
MOTOR
6
PUMP
4
RESERVOIR
5
VALVE
3
16
2
1

SAFETY SYSTEM FOR LIFT TRUCKS

With lift trucks increasingly higher lifting heights have become a reality in recent years since for economical reasons is advantagous to keep the floor area of the warehouse as small as possible. Moreover the trucks must be able to maneuver in narrow alleys the support area of the trucks will be comparatively small. These factors result in Increasing demands on the stability of the truck. The stability of the truck is however not only influenced by its design, dimensions, degree of wear etc. but also of the loads that are lifted. It is consequently important that the driver uses his judgement and for instance does not lift too large loads too high or execute too fast maneuvers with a too heavy load too high up. Since modern trucks are provided with increasingly more powerful engines and higher battery capacities it is not always certain that the driver notices or even considers how heavy load he is handling.

In order to increase safety in view of the above problem of lifting with in particular high lifting trucks it is in accordance with the invention proposed to provide a weight indication for the driver so that he knows how heavy a load he is handling. This weight indication is in accordance with the invention carried out by measuring the current to the motor of the hydraulic pump. In order to eliminate the risk that occasional variations result in an erroneous measuring preferably a mean value of the current is taken during a certain time or the current is integrated during a fixed time interval. Obtained values are then multiplied with a conversion factor so that the weight in for instance kg is obtained arid fed to a suitable representation device that may be digital or analog. Possibly the calibration weight indication may automatically control the indication in kilograms, lbs etc. The weight may of course also be presented as a percentage of allowed maximum load.

Since when lifting not only the load itself is lifted up hydraulically but also load forks, fork carriage etc. the measuring device is preferably set to zero or calibrated by measuring a lift without load. Since furthermore the inertia or rolling friction of the fork carriage etc. may vary from truck to truck calibration may as an alternative be done by lifting of a calibration weight. Preferably the calibration weight may be of the same size as the weights preferred to have the most correct measured value or have a slightly higher weight.

Since for instance the viscosity of the hydraulic oil may change during a work shift the 0-position may be altered during use, that is in principal the current necessary for an unload lift. If desired a corresponding adjustment of the measured value can be carried out successfully since checking and comparing can be carried out by means of a small computer or microprocessor every time an unload lift is executed.

Preferably the weight of the load is measured during a free lift, that is the movement when the fork carriage moves in an associated extendable mast that is in its lowest position. During this movement the lifted weight associated with the truck is the lowest in relation to the load and therefor the best precision of measuring of the weight is obtained. Since it may however also be important during lowering of a load that is situated very high up already at the lifting of this from its stowed place to know its weight at least a rough weight indication may be very important. In order to achieve this compensation can be made for the weight of the lifted mast, that is the current that the motor of the hydraulic pump requires for lifting higher than the free lift without load. Since this movement essentially has the same motion pattern from time to time comparatively exact current values may be obtained that can be subtracted from the current obtained when the load initially is lifted. Alternatively the current that is then obtained is compared with the current required for the lifting of the unloaded forks shortly before the intended lifting position has been reached. In other words the load changes may be indicated.

The differentiation of the measuring device between a free lift or a higher lift may easily be achieved by means of a switch or other sensor placed in the vicinity of the lower end of the mast, which switch is influenced as soon the mast is in its lowest position. When the mast is in its lowest position it is a free lift and otherwise it is a lift in which the entire mast take part. Alternatively a switch may be used that reacts at the passing of the upper end of the free lift and that at each passage switch measuring mode. If lift height indication is present this can be used to deliver this information.

Since the current is not a direct measurement of the weight that is lifted, but also depends on the acceleration of the lifting movements, the measuring device preferably during the weight evaluation controls the movement to have a constant speed. This can for instance be done by controlling the voltage during the measurement, which voltage is to be essentially constant in order to indicate constant velocity, alternatively compensation can take place for the acceleration.

The constant speed at measuring is preferably chosen to be considerably lower than maximum speed for lifting so that the influence of hydraulic flow losses is reduced. Preferably the measurement, in any case if a good accuracy is desired, is carried out at the same speed from measurement to measurement.

To the weight indication may be coupled a warning signal that is activated if too big loads are about to be handled.

Since not only the weights of the loads but also the heights to which these are handled influence stability, a display may also indicate the height to which a particular load may be lifted. Thus when the driver lists a load from the ground or from a lorry he will know the highest permitted storage height to which that load may be lifted in the warehouse. The indication may be given directly in permitted storage or the device may be programmed to take into account the other trucks working in the warehouse so that no loads will get out of reach of certain trucks. Preferably the truck is also equipped with an additional indication or warning device that indicates or warns if the maximum load is exceeded. By further combining the weight measure in with a device for the measurement of the position of the lifting forks one can obtain an indication or warning if one tries to take a too great load too high up. Of course the driver can keep track of this based exclusively on the weight that is lifted and his knowledge of permitted weights for different heights, but it will be appreciated a warning system increases the safety in the work.

When measuring of load weights takes place the remaining hydraulic power users are disconnected and only lifting takes place with the motor at which the current is measured.

The monitoring of the current can also be used for other purposes. For instance it is also possible to detect obstructions to the movement as well as mechanical end stops, since a resistance to movement immediately will result in an increased current.

In the case of an unexpected rise of the current this may indicate that the movement is obstructed by for instance another load pallet and the movement can then be disrupted before any damage is done.

The mechanical end stops of the movement will also be detectable in this way and by keeping track of the travel of the movement the movement speed can be reduced before these end stops are reached (speed ramping). This procedure may be self learning so that if the preset ramping is insufficient it is reset to begin earlier.

The movement travel can be determined by monitoring and integrating the voltage of the motor over the time, since the voltage will be proportional to the speed of the motor.

In the enclosed drawing the principal layout of an embodiment of the invention is shown. A lifting cylinder 1, coupled to forks and mast, is coupled to a pump 4 via a hose 2 and an electrically controlled hydraulic valve 3. The pump is also connected to a reservoir 5. The pump is driven by an electric motor 6, which gets it power from a battery 7 via leads 8 and 9 and a regulator 10. In one 8 of the leads from the battery to the motor a sensor 11 is arranged to sense the amperometric value of the electric current to the motor 6. The sensor is connected 12 to a computer 13 that evaluates the sensed current and delivers a weight indication to a display 14 or warns via a signal device 15. In order to sense if the mast of the truck is involved in lifting or not a switch 16 arranged in the vicinity of the mast is also connected to the computer 13.

Two additional leads 17, 18 from the poles of the motor 6 are connected to the computer 13 allowing this to monitor the voltage of the motor and thus the speed of the motor and travel of the piston.

We claim:

1. In combination with a lift truck having a hydraulic cylinder coupled to lift forks for vertical lifting on a mast, said hydraulic cylinder being driven by an electrically powered pump, a safety system comprising a current sensor for sensing the amperometric value of electric current being fed to the electrically powered pump, a position sensor for sensing, the vertical height of said lift forks, said current sensor and said position sensor being connected to a computer which compares the amperometric current sensed with a standard current based on a lift of a calibrated weight or an unloaded lift and integrates same with a signal from said position sensor, and a signaling device for warning if a maximum load for a given height is exceeded.

2. In a combination according to claim 1, wherein lifting speed is held constant, and said computer is arranged to integrate the lifting speed and the current sensed to compensate for weight of the load.

3. In a combination according to claim 1, wherein a plurality of current measurements are taken, and integrated over time by the computer.

4. In a combination according to claim 1, wherein the signaling device includes an audible alarm.

5. In a combination according to claim 1, wherein the signaling device includes a visual display.

6. In a combination according to claim 1, and further including sensors mounted on the mast at end stop locations.

7. In a combination according to claim 6, wherein said computer provides a signal for reducing lift speed before the end stop locations are reached.

8. In a combination according to claim 1, wherein the computer is programmed with preset lift height or weight limits.

9. In a combination according to claim 1, wherein the signaling device comprises an analog display.

10. In a combination according to claim 1, wherein the signaling device comprises a digital display.

11. In a combination according to claim 1, wherein the computer is calibrated by measuring current with the forks unloaded.

12. In a combination according to claim 1, wherein the computer is calibrated using a calibrated load.

13. In a combination according to claim 1, wherein the computer is calibrated under free lift conditions.

* * * * *